Feb. 4, 1964 N. J. BERRIDGE 3,120,443
PROCESSES FOR THE MANUFACTURE OF CHEESE CURD AND OF CASEIN
Filed May 9, 1961 2 Sheets-Sheet 1

INVENTOR
NORMAN JAMES BERRIDGE
ATTORNEYS

Feb. 4, 1964     N. J. BERRIDGE     3,120,443
PROCESSES FOR THE MANUFACTURE OF CHEESE CURD AND OF CASEIN
Filed May 9, 1961     2 Sheets-Sheet 2

INVENTOR
NORMAN JAMES BERRIDGE
By Bailey, Stephens & Huettig
ATTORNEYS

United States Patent Office 3,120,443
Patented Feb. 4, 1964

3,120,443
PROCESSES FOR THE MANUFACTURE OF
CHEESE CURD AND OF CASEIN
Norman J. Berridge, Shinfield, near Reading, England, assignor to National Research Development Corporation, London, England, a British corporation
Filed May 9, 1961, Ser. No. 108,949
Claims priority, application Great Britain May 12, 1960
24 Claims. (Cl. 99—116)

This invention relates to apparatus and processes for the manufacture of cheese curd and of casein. This application is a continuation-in-part of application Serial No. 824,485, filed on July 2, 1959, now Patent No. 2,997,395.

In the most commonly practised process for manufacturing cheese, raw milk is cooled, stored if necessary, flash heated, and its temperature adjusted to about 30° C. It is then run into a vessel in which a starter and rennet are added. The mixture comprising raw milk, rennet, starter and, if required, any other acidifying substances, used as starting product for curd-formation is hereinafter referred to as the curd-forming mixture. The curd produced therefrom is cut into small pieces by hand or with suitable mechanical assistance, and further treated by gradually raising the temperature while stirring to about 35–40° C. holding it at this temperature for a controlled period and allowing it to settle so that the whey may be removed. This process requires great care and skill to avoid losing too much fat from the delicate curd, and to ensure that acid development occurs at the required rate. Further processes of piling and/or draining must be carried out before the curd is in the final form, i.e., sufficiently firm, of the right acidity and containing up to 50% moisture (e.g. 44%). It will be understood, of course, that the fermentation properties of both milk and starter are variable quantities, and that it is in the careful control of the above conditions within the various limits imposed by different cheeses and different qualities of milk and starter that the art of the cheese-maker is exercised.

Care must be taken that the acid formation by the starter proceeds at a suitable rate in relation to the coagulation of the curd and separation of the whey. The process, after adding rennet, usually takes four to six hours.

For certain types of cheese, e.g., coulommier (and for the manufacture of rennet casein) the acidifying substance is omitted. In these types of cheeses, some degree of acidification occurs after curd is made. The acid is produced by the activity of bacteria derived from the milk. In rennet casein manufacture the process is similar to that of cheese making except that no acidity is allowed to develop and separated milk is used.

In Patent No. 2,997,395, there is described a process for the manufacture of cheese curd or casein which comprises holding the curd-forming mixture, consisting of milk, rennet and if required acidifying substances, at a temperature of not more than 15° C. for at least a period of time such that the enzymic action of the rennet is nearing completion or is complete, subsequently quickly heating the mixture to a temperature of not less than 30° C., and holding the mixture at that temperature so that rapid coagulation of curd and rapid exudation of whey can occur. By rapid coagulation is meant rapid formation of a jelly throughout the mass of the curd-forming mixture. Where acidifying substances are added, they may be the usual starter or other micro-organisms or an acid, e.g., hydrochloric acid, or a combination of both starter and acid. Particularly suitable starters have been found to be *Streptococcus thermophilus* and *Streptococcus cremoris*. Other acidifying substances may be used if required, for example lactone or an ester and esterase. The acidifying substances are added in sufficient quantities to give the milk a pH of 5.6 to 6.0. In a preferred process, a small quantity of starter (2%) is used in combination with hydrochloric acid. This small amount of starter produces acid after the curd has been formed and assists in the ripening of the curd.

It is further stated in the afore-mentioned application that the second stage of the process, i.e., the rapid heating stage, is conveniently carried out by allowing the curd-forming mixture to flow as a thin layer over a heated surface, e.g., the surface of a plate or trough, or by depositing the curd-forming mixture on a heated surface from which it is subsequently removed after a suitable period of time has elapsed (e.g., 20 to 100 secs.). One advantage of this process is that it can be used in the continuous production of cheese. Moreover the curd can be obtained in an acceptable form after curdling more easily than is the case with conventional cheese-making techniques.

The temperature restrictions of less than 15° C. for the stage of the process at which the enzymic action takes place and above 30° C. for the stage at which coagulation occurs are, however, not essential to the process. An acceptable curd can be obtained provided that the coagulation stage is carried out on a curd-forming mixture in which the enzymic action of the rennet is nearing completion or is complete, but in which coagulation has not commenced regardless of the process by which this mixture has been obtained, provided also that the curd-forming mixture is heated in a form in which the surface area is large compared with the volume as opposed to being heated in bulk as in conventional cheese-making practice.

According to the invention, therefore, there is provided a process for the manufacture of cheese curd or casein, which comprises heating a curd-forming mixture, in which the enzymic action of the rennet is nearing completion or is complete but in which coagulation has not visibly commenced, in a form in which its surface area is large compared with its volume to cause rapid coagulation of the curd-forming mixture followed by rapid exudation of whey.

The curd-forming mixture can be obtained in the state in which the enzymic action of the rennet is nearing completion or is complete but in which coagulation has not visibly commenced by allowing the curd-forming mixture to stand for a period of time, hereinafter referred to as the rennetting time, which depends upon the quantity of rennet in the mixture, the pH of the mixture, the temperature at which the mixture is allowed to stand, and also on the biochemical properties of the milk. Thus the greater the proportion of rennet in the mixture the shorter the rennetting time. Similarly the lower the pH of the mixture, within limits, the shorter the rennetting time. The pH can be adjusted by the addition of acidifying substances which may comprise the usual starter alone, for example *Streptococcus cremoris* or other micro-organisms, or an acid, e.g., hydrochloric acid, or a combination of starter and acid. The acid is added to shorten the rennetting time, but the pH should not in general be lowered below 5.6 as, if this is done, subsequent coagulation of the mixture gives rise to a curd which is soft and sticky when hot. A pH range of 5.6 to 6.0 has been found to be convenient in many cases. The rennetting action can be allowed to take place at even lower pH values, however, if the pH of the mixture is subsequently adjusted to above 5.6 and the mixture allowed to stand for some time at this higher pH before coagulation. Even using this method, however, the lower limit of pH cannot in general be reduced below 5.0, as, for instance casein is completely precipitated by acid at pH 4.7, precipitation beginning at a pH of about 4.8–4.9. Moreover, it has been found that certain starters shorten the time for which the curd-forming mixture can be stored at a low temperature without coagulation. When using these starters, therefore, it is sometimes advantageous to add the rennet to the milk and allow the enzymic action of the rennet to take place before adding the starter. The starter is then added just prior to the coagulation step. The higher the temperature at which the rennetting action is allowed to take place, the shorter the time required and also the greater the tendency to coagulate. The temperature must be such, therefore, that the rennetting action is complete or is nearing completion before coagulation takes place. Such a temperature is generally below 30° C. and is preferably below 20° C.

In cases where no acidifying substances are used in the curd-forming mixture, larger quantities of rennet (e.g., 20 to 30 times) or longer holding periods at low temperatures (e.g. 5 hours) or a combination of the two (e.g., 5 times the rennet and one hour holding period) are desirable. If too short a holding period is used, the milk will subsequently take too long to coagulate on being quickly heated, and the curd formed will be too soft with a result that the exuding whey will contain a surplus of fat. If too long a holding period is used, the curd-forming mixture will thicken in the cold, with the result that once again large losses of fat in the whey will occur.

Examples of some minimum and maximum rennetting times for a particular sample of milk for various pH and temperature conditions are given in Table 1 below. It will be appreciated, however, that the biochemical properties of milk vary from sample to sample, and that the only method of determining the rennetting time for a particular sample is by simple experiment. In practice, however, day-to-day variations in milk from the same source are only slight. Experience from previous days is therefore usually adequate for the control of the curd-forming mixture.

The minimum acceptable rennetting time can roughly be calculated by doubling the time required for the curd-forming mixture to clot at 30° C. for every ten centigrade degrees below 30° C. at which the mixture is held. It may be determined experimentally as being approximately equal to the minimum time of action to give an almost instantaneous clot when subsequently spotted on to a metal at 60° C. However, a firmer and drier curd is obtained if a period equal to three or more times this minimum is allowed for the action of the rennet.

TABLE 1

*Minimum [1] and Maximum [2] Rennetting Times for Curd-Forming Mixtures at Various Temperatures*

|  | Temp., ° C. | Minimum, Minutes | Maximum, Minutes |
| --- | --- | --- | --- |
| Raw milk pH 6.02 | 25 | 2 | 6. |
|  | 20 | 3 | 16. |
|  | 15 | 3.5 | >270. <1200. |
| Hansen's rennet at 1/2500 | 30 | 2 | 4. |
|  | 15 | 3.75 | 120. |
|  | 10 | 6.5 | >360 (10° C. for about an hour). |
| Raw milk pH 5.82 | 25 | 1–1.5 | 3.75. |
|  | 20 | 1.5 | 8. |
| Hansen's rennet at 1/2500 | 15 | 2 | >17. |
|  | 15 | 2.5 | 35. |
|  | 10 | 3.25 | >330. |
| Raw milk pH 5.6 | 25 | 0.5 | 3.75. |
|  | 20 | 1 | 3.75. |
| Hansen's rennet at 1/2500 | 15 | 1 | 20. |
|  | 10 | 1.75 | >330. |

[1] Minimum=minimum time of action to give an almost instant-clot when subsequently spotted on to metal at 60° C.
[2] Maximum time of action before granularity becomes apparent.
The maximum values are very approximate indeed owing to the gradual nature of the thickening of the milk and the appearance of granularity. These values are probably affected more by the physic-chemical properties of the milk than by the quantities of rennet added.

The conditions under which the rennet action takes place have been found to affect the form of the curd produced by subsequent coagulation and, in general, a rennetting time of about one hour at about 10° C. has been found to produce the most acceptable curd upon coagulation. If such a rennetting time and temperature are to be used, the curd-forming mixture can be first tested to determine whether or not such a treatment will be satisfactory in completing the enzymic action and, if necessary, the contents of the mixture adjusted so that the treatment will be satisfactory.

The treatment of the curd-forming mixture to effect completion or near completion of the enzymic action of the rennet can if desired be performed continuously. Thus milk, rennet and, if required, acidifying substances can be continuously introduced into any form of delay line such as a long pipe or a number of vessels connected in series or a tank which is divided into a series of compartments by a number of transverse partitions provided with holes allowing flow of fluid between the compartments. The rate of inflow of milk, rennet, etc. can be adjusted so that the average time taken to pass from one end of the tank to the other, at which the mixture is removed, via the intervening compartments is a satisfactory rennetting time. Test samples can from time to time be removed from different sections of the tank and checked to ensure that rennetting is in fact proceeding satisfactorily.

When a tank with five sections is used, the condition of the curd-forming mixture is generally satisfactory if a sample from section 2 or 3 (counting in the direction of milk flow) clots when allowed to flow very gently one drop at a time on to the surface of water at 60° C. The drops sink but coagulate before they mix. If this result is obtained only with samples from sections 4 or 5 the curd will generally not be satisfactory. If a sample from section 1 coagulates there is danger of premature coagulation. The milk may be too acid. The situation may be adjusted by alterations in the inflow rates of the milk, rennet and/or acidifying substances according to requirements.

The form of the curd-forming mixture, and the temperature to which and the time for which the curd-forming mixture is heated to effect rapid coagulation of curd vary with the conditions of the process. The larger the surface area of the mixture as compared with its volume and the higher the temperature to which it is heated, the more rapid will be the coagulation. The curd should not in general be heated above 70° C., however, as such a hot curd tends to stick and is difficult to handle. A preferred temperature for carrying out the process is in the range of about 30° C. to 70° C., and temperatures from 50° C. to 70° C. have been found especially suitable.

The maximum temperature is usually limited by the starter. Each strain has a different sensitivity. When, as is usually the case, an active starter is required in the curd it is necessary to find by experiment the effect of different time-and-temperature combinations on the starters to be used to ensure that the starter used is capable of remaining active under the conditions of the process. Coagulation should occur very quickly is an acceptable curd is to be obtained, but the heating is often continued after coagulation for a short time (e.g., 30 secs.) as this does not harm the curd and it assists the expulsion of whey.

The heating of the curd-forming mixture is preferably carried out by contacting it in the form of a thin film with a heated metal surface. A thin film is required in order that all the curd-forming mixture can be quickly heated, and thus rapidly coagulated and a film less than 1 millimetre thick has been found to be convenient. If it can be arranged that both sides of the film be heated, then thicker films may be used. In one particularly convenient method, the curd-forming mixture is delivered as a thin layer on the heated metal surface of a rotating cylinder and is allowed to remain in contact with said heated surface until coagulation of curd has occurred. A layer, thickness of about 0.2 mm. has been found suitable using this method.

In a preferred aspect of this method, the curd-forming mixture is fed on to the heated outer metal surface of a cylinder rotating about a substantially horizontal axis, at a point such that the curd-forming mixture is kept in contact with the said heated surface by the force of gravity and surface tension for a period of time such that rapid coagulation of the curd-forming mixture occurs, and the curd is then removed from the heated surface. This removal of the curd is preferably effected at least in part by the force of gravity, the cylinder by this time having rotated to such a position that gravity tends to remove the curd from the cylinder, but can alternatively be carried out by use of a scraper or the like.

In one particular method of the invention, the curd-forming mixture is delivered onto the heated surface of the rotating cylinder at a position on the ascending side of the cylinder slightly removed from the vertical plane in which the rotational axis of the cylinder lies, the rotational speed of the cylinder being arranged such that, by the time the force of gravity is acting upon the curd to remove it from the heated surface, coagulation has occurred. A brush, scraper or the like can be situated at a position around the circumference of the cylinder beyond that at which the curd is removed so as to remove exuded whey which has adhered to the surface of the cylinder. A brush rotating at a speed of the order of 100 revolutions per minute in the same rotational direction as that of the cylinder has been found to be most suitable. Where the position of the brush, scraper or the like is on the upwards moving side of the rotating cylinder the detached whey can flow back down the surface of the cylinder towards the point at which the curd is removed tending to remove any curd which might otherwise adhere to the surface of the cylinder and thus acting as an aid to the force of gravity in its removal. It is desirable to avoid such compete removal of the whey that the metal surface of the cylinder is left dry beyond the brush as it is to this surface that the fresh curd-forming mixture is added and a certain degree of wetness on the metal is an aid to the formation of a satisfactory thin layer.

The speed of rotation of the cylinder, which satisfies the above requirements can be ascertained by simple experiment and has been found to be in the range of 20 to 40 rotations per minute. This range was found in relation to a cylinder of 9" radius, and it may be that different preferred ranges will apply for cylinders of different radii. A rotational speed of 30 rotations per minute, which means that the contact time of the curd-forming mixture is about 1 second has been found to be particularly satisfactory. In any case, the peripheral speed of the cylinder is preferably such that little relative movement takes place between the curd-forming mixture and the surface of the cylinder during coagulation. Some relative motion must, of course, take place as the acceleration in the vertical plane due to the rotation of the cylinder is sinusoidal and that due to gravity is parabolic. Nevertheless the difference is not enough to spoil the clotting of the milk providing the film of the curd-forming mixture is thin enough because the coagulation is so rapid. If, however, too thick a film is used, the process will not work, and it is believed that the slower heating incidental to the use of a thicker film causes the difference between the sinusoidal and parabolic accelerations to become critical.

The outer surface of the cylinder may be heated by steam introduced inside the cylinder or by a spray of hot water directed on to the inside of the surface. The temperature to which the surface is heated is generally in the range of 60 to 100° C. when the curd-forming mixture, which is usually only in contact with the heated surface for about 1 second is heated sufficiently to cause coagulation to take place.

The curd-forming mixture may be delivered on to the heated surface of the cylinder through a pipe, and, in order to obtain a satisfactory thin layer, slow flow is in general essential. A pipe of the maximum diameter that is commensurate with slow flow may be used, and this has been found to be about ¼" diameter although it might be possible with special care to use pipes of larger diameter. If too narrow a pipe is used, a jet is obtained and this is undesirable. Using pipes of ¼" diameter, each pipe will deliver curd-forming mixture to the cylinder at a rate of about 6 gallons per hour. Therefore the number of pipes depends on the rate at which it is desired to work.

The linear speed of delivery of the curd-forming mixture on to the metal surface is important. If too fast a delivery speed is used, the curd-forming mixture tends to stick to the surface of the cylinder whilst if the speed is too slow incomplete coagulation tends to occur with part of the curd-forming mixture remaining liquid. The speed of delivery depends on the height of the orifice of the delivery pipe above the drum, and a height of between 1" and 2" has been found satisfactory.

Immediately coagulation has occurred, the coagulated curd starts to exude whey, and satisfactory exudation is essential to the formation of an acceptable curd. It is usually important to maintain the curd at an elevated temperature during exudation, although temperatures lower than those generally used in the process for coagulation will suffice. One method tried for allowing the curd to exude whey is to deliver the curd straight off the rotating cylinder on to a woven metal wire drainage belt. It has been found that this method is not generally satisfactory as the curd tends to stick to the belt. It might be possible, however, to use a fabric belt without this difficulty arising.

An alternative method which has produced a satisfactory curd involves allowing the curd to exude whey whilst in contact with additional warm whey. The whey supports the curd, preventing structural damage and fat losses and maintaining the curd in the form of very thin layers, so that the further exudation of whey is not impeded. One method of doing this is to deliver the curd from the cylinder on to a sloping plate with a smooth plastic surface such as polythene or polytetrafluoroethylene which in turn delivers the curd either directly or via a plastic pipe on to the surface of a shallow trough of warm whey. The plastic surface prevents the curd sticking to the sloping plate, and the curd and the whey which is draining from it are kept together for some time in the pipe and/or trough. Moreover, additional whey may be introduced on to the sloping plate so that the curd and additional whey slide down the plate together. This reduces the risk of curd sticking to the plate, and makes the form and substance of the plate surface less critical. Another alternative tried with some success is to feed the curd on to the sloping plastic plate and thence into a plastic tube of length such that the curd takes at least several seconds to pass through the tubing. Twelve seconds is enough to prevent the curd sticking to the belt, but the longer the time the firmer, the drier, and the less sticky is the resultant curd. Times up to 15 minutes have been found acceptable. After such treatment the curd can be fed on to the drainage belt. The curd sometimes tends to form blockages in the plastic tubing, but this disadvantage can be offset in several ways, one of which is by the introduction of additional whey to the curd before it flows into the tubing. The additional recirculated whey must of course be adjusted by means of a heat exchanger to a suitable temperature, e.g., to 45 or 50°, otherwise chilled curd will be produced. This modification permits an additional treatment of the curd, for example washing by using diluted whey instead of full strength whey.

Further according to the invention, there is provided apparatus for carrying out the process of the invention comprising a horizontally-mounted cylinder, said cylinder having a metallic outer surface means for delivering a thin film of curd-forming mixture on to the outer surface of the said cylinder at a position such that the curd-forming mixture is maintained in contact with the said surface by force of gravity and surface tension, means for heating the outer surface of the cylinder to a temperature in the range of about 60° C. to 100° C. and means for rotating the cylinder about its horizontal axis at a speed such that the curd-forming mixture is maintained in contact with the outer surface until coagulation has occurred.

Preferably the apparatus is provided with a brush, scraper or the like on the upwards moving side of the cylinder which serves to remove exuded whey which has adhered to the surface of the cylinder. A brush rotating at a speed of the order of 100 revolutions per minute in the same rotational direction as that of the cylinder is preferred.

The apparatus is preferably provided with means for contacting curd removed from the cylinder with additional whey during exudation of the curd.

This particular method will now be described with reference to a particular embodiment of the apparatus, illustrated in the accompanying drawings, in which.

Figure 1:
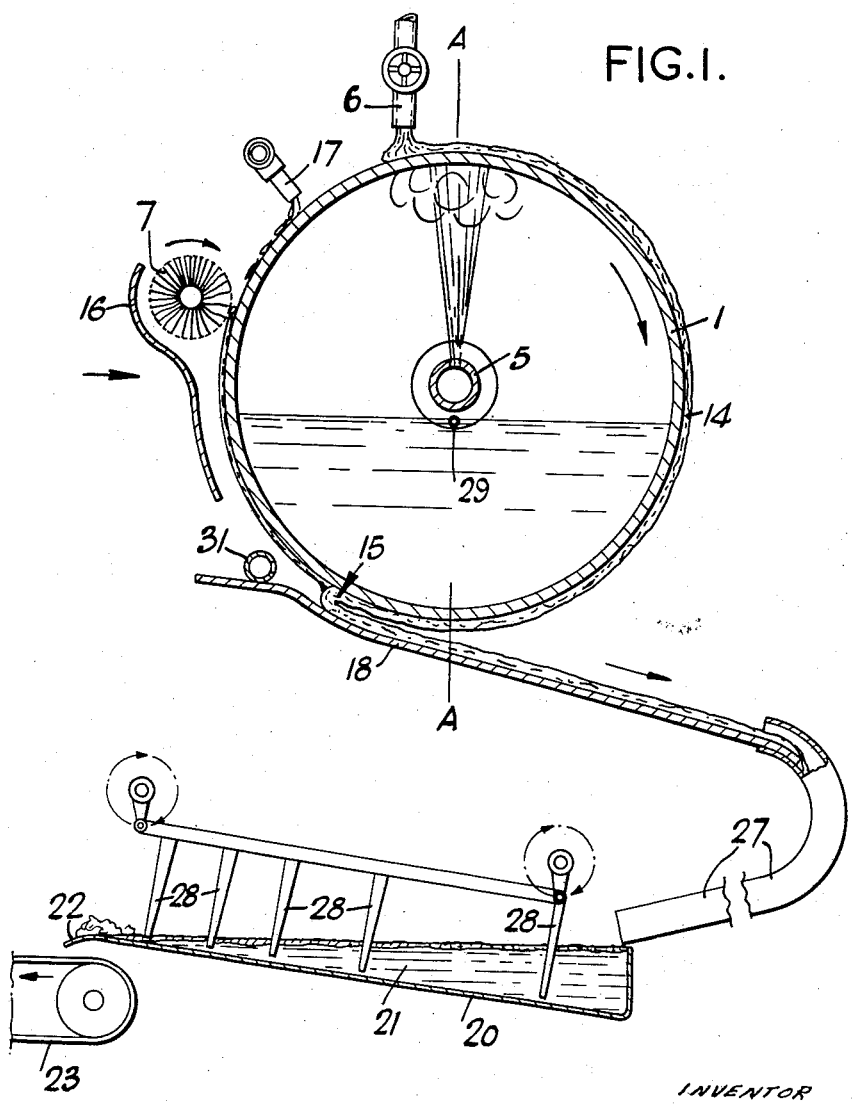
FIGURE 1 is a cross-section of the part of the apparatus used for the coagulation of curd and exudation of whey.
Figure 2:
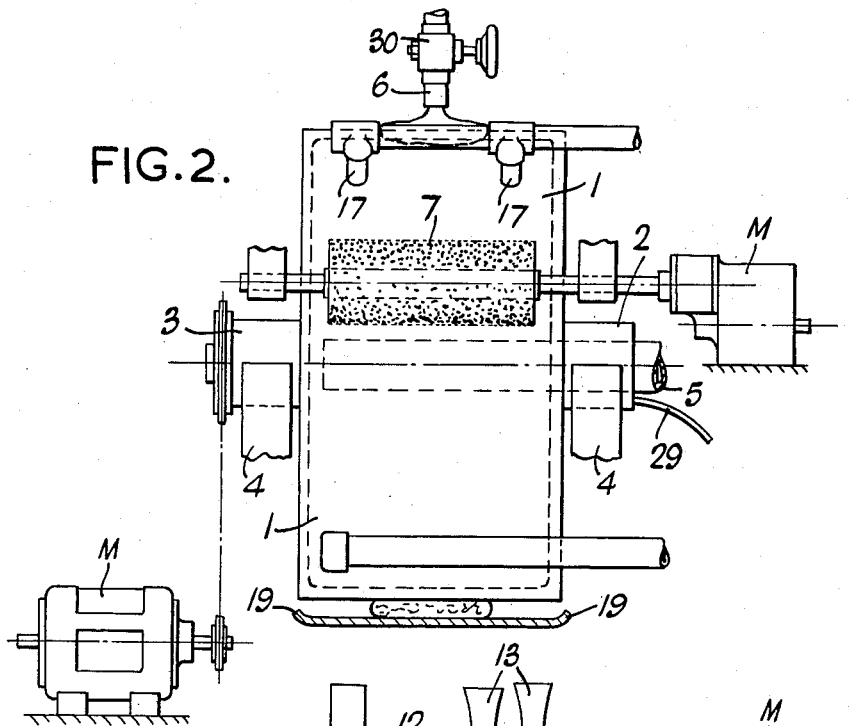
FIGURE 2 is an elevation of the part of the apparatus responsible for coagulation.

Referring first to FIGURES 1 and 2, a hollow stainless steel cylinder 1 is mounted so that it can rotate in a horizontal axis by means of cylindrical end pieces 2 and 3 which rest on supports 4. In use, the cylinder 1 is rotated by a motor M, the drive of which is connected to the end-piece 3. The end-piece 2 is open and a pipe 5 passes through it into the cylinder for the introduction of steam. The condensed steam collects in the bottom of the cylinder until the water level reaches the open end-piece 2, when it overflows out of the cylinder. The sensing element of a thermostat 29 is inserted through 2 so that it is immersed in the condensate.

The curd-forming mixture is introduced on to the surface of the cylinder at a position on the ascending side of the cylinder slightly removed from the plane AA by means of a feed-pipe 6 of ¼" diameter arranged 1½" above the surface of the cylinder. A cylindrically shaped brush 7 is also arranged on the ascending side of the cylinder but below the feed pipes, the brush serving to remove whey and curd which adheres to the surface of the cylinder before the introduction on to the surface of fresh curd-forming mixture. The brush 7 is rotated at 100 revolutions per minute in the same rotational direction as that of the cylinder.

The curd-forming mixture is prepared in the delay tank 8, which is divided into five compartments by means of transverse partitions 9. Holes 10 are provided in the partitions, the holes 10 on adjacent partitions being situated at opposite sides of the tank. Milk, rennet, and, if required, acidifying substances are mixed in the vessel 24, the contents of which are stirred by the stirrer 25, and are then fed into the compartment 11, of the delay tank 8, the inflow speed being arranged such that the average time for the mixture to pass through the tank and out through the overflow 12 is about an hour. The whole tank is lagged so that the temperature of the milk, previously cooled to about 10° C., does not rise unduly (not more than 1–2° C.) and the mixture is continuously stirred by paddles 13 driven by the motor M. From the tank 8, the curd-forming mixture passes to a balance tube 26 and thence to the feed pipe 6.

If required, an additional mixing vessel may be inserted between the overflow 12 and the balance tube 26. The level of the curd-forming mixture in the balance tube is an indication of the thickness of the mixture, which can be controlled as required by the addition of calcium chloride to the additional mixing vessel. Moreover any further additions of starter, acidifying substances, coagulation promoting salts and/or any other requirements may be made in this additional tank. From this additional tank, the mixture can be passed into the widened end of a U-shaped tube (not shown) of such length and diameter that the head of liquid available suffices to cause flow at a sufficient rate when the viscosity of the mixture is normal. From the U-tube the curd-forming mixture passes to the balance tube 26 and thence to the feed-pipe 6. The rate of flow of the curd-forming mixture through the feed pipe 6 may be controlled by the flow control 30, though once the system is working this control is not necessary when there is only one feed pipe. If there are more than one each much be controlled.

Providing the input rate of the curd-forming mixture from vessel 24 is maintained reasonably constant any significant increase in the viscosity of the curd-forming mixture such as occurs just before curdling causes a rise in the level of liquid in the wide part of the U-tube. This rise is used to control the rate of addition of additives to the additional tank. (As an alternative it could be used to control the temperature of the milk in the tank 8.) In either case it makes possible the feeding of curd-forming mixture almost at the point of coagulation on to the cylinder.

The mixture is delivered through the feed-pipe 6 on to the surface of the rotating cylinder 1 in the form of a slow flow, so that a thin layer 14 is formed on the cylinder's surface. (The thickness of the layer is exaggerated in the drawing for the sake of clarity.) The cylinder is rotated at 30 revolutions per minute. Enough steam is passed through the pipe 5 to maintain the condensate at 73° C. The mixture coagulates almost immediately and is carried round by the cylinder until it is removed at 15 (again slightly on the ascending side of the cylinder) by the combined effects of gravity and the obstruction caused by the whey flowing back from the brush 7 along the surface of the cylinder. A shield 16 (not shown in FIGURE 2) is provided over the brush 7 so as to prevent whey being scattered in all directions by the brush. Water pipes 17 are provided beyond the brush 7, each pipe being positioned so as to coincide with the edge of a layer of whey emanating from the curd strip. This is to counteract a tendency for dry whey to build up at the edges of the layer, and a slow drip of water from the pipes 17 is usually adequate to prevent this.

The curd peels off from the rotating cylinder 1 on to a curved and sloping plate 18 coated with polytetrafluoroethylene, the sides 19 of which are turned up to prevent loss of curd over the edges of the plate. The curd slides down this plate and through a short polythene tube 27 into a shallow trough 20 containing warm whey 21. Unlike conventional curd, this curd at this stage will float in whey and it floats across the surface of the trough of whey with mechanical assistance and is removed at 22, where it passes on to a drainage belt 23. The mechanical assistance shown in the drawing comprises a number of reciprocating vertical paddles 28, which are crank driven so that each paddle makes one sweep approximately every two minutes. The whey passes through the trough more quickly than the curd. This permits relatively long contact times which in fact depend on the rate the curd is moved from the trough. It is then in an acceptable form for cheddaring etc.

If desired, additional whey can be introduced on to the plate 18 through the pipe 31. This whey then mixes with the curd sliding down the plate and by such use of additional whey, it is sometimes possible to do away with the use of the trough of whey.

Alternatively the heating may be carried out by pouring the curd-forming mixture on to a flat heated plate. A thin layer of the mixture forms on the plate and immediately coagulates. The plate may be heated to a temperature in the range of 60 to 100° C. when the mixture, if left on the plate for 5 to 30 seconds, will be warmed to a temperature in the range 30 to 70° C. The curd so formed is swept off the plate after 5 to 30 seconds and allowed to drain in the usual way.

Alternatively the heating may be carried out by contacting the curd-forming mixture with a hot liquid, e.g., water or whey, or a hot gas, e.g., steam. Thus the mixture may be contacted with hot whey, laminar flow of the mixture and of the whey being maintained and the surface area between the mixture and the heating fluid being made large compared with its volume. Coagulation is so rapid that mixing does not take place. Again, the curd-forming mixture may be spread on a moving belt and heated in an atmosphere of steam, or by transfer of heat through the belt.

The process of the invention is particularly applicable to the continuous production of cheese. Thus the curd-forming mixture can first be obtained in the form in which the enzymic action is complete and can then be continuously coagulated as hereinbefore described. Alternatively, the mixture of milk, rennet and acidifying substances may be placed upon a continuously moving belt, the first section through with the mixture passes being at such a temperature that the enzymic action takes place without coagulation, and the temperature of the second stage being such that rapid coagulation and exudation of whey occurs. It will be understood that the temperature for these two stages may be the same, but that this will not in general be the case as, at a temperature such that the enzymic action is complete before coagulation the subsequent coagulation will not normally take place sufficiently rapidly. It is to be understood that for some types of cheese, further treatment of the curd, e.g., cheddaring, may be required.

The following examples illustrate the invention:

EXAMPLE 1

Ten gallons of milk were acidified with N. hydrochloric acid to a pH of 5.8±0.05, inoculated with starter at 1–2% and cooled to about 5° C. This milk was aspirated through sterilised tubing into sterilised 10 litre aspirators which were stored at 5° C. To each aspirator (containing approximately 2 gallons of milk) was added 2 mils. of rennet and the rennet allowed to act for 45 minutes at the refrigeration temperature, i.e., 5° C. The milk from the aspirator was then continuously fed on to a circular steel heating plate. The plate was 6″ in diameter, machined flat with a narrow raised edge and a raised centre to confine the milk and a sector-shaped gap of about 30° C. through which the curd fell after each cycle. The plate was heated by hot water circulated in channels machined out of the metal and closed below by a copper gasket and mild steel plate. A frame carrying a scraper and just behind it, a milk spreader, rotated one revolution in 5 seconds and then waited 25 seconds before the next revolution. Thus the milk spreader spread the curd-forming mixture over the hot plate, where it remained for 25–30 seconds before being swept off the plate through the sector in the plate by the rotating scraper. The curd was swept on to a draining belt where it was drained prior to storing.

EXAMPLE 2

Experiments were carried out as in Example 1 using 1 gallon of milk per experiment and varying the temperature of the hot plate, time of contact with the plate, etc. The following table illustrates the results obtained:

TABLE 2

[Each column represents one run with 1 gallon milk]

| | | | | | | | | |
|---|---|---|---|---|---|---|---|---|
| Temperature of circulating water (° C.) | 60 | 60 | 70 | 70 | 70 | 80 | 80 | 80 |
| Cycle time including 6 sec. wipe-off time (sec.) [1] | 55 | 99 | 28 | 55 | 99 | 28 | 46 | 99 |
| Vol. of milk misture per cycle (ml.) | 116 | | 82 | 105 | 167 | 92 | 116 | 196 |
| Volume of milk mixture cycle time÷(ml./sec.) | 2.1 | | 2.9 | 1.9 | 1.7 | 3.3 | 2.5 | 1.9 |
| Temperature of curd leaving plate (° C.) | 50 | 51 | 51 | 56 | 59 | 57 | 62 | 86 |
| Temperature of curd leaving belt (° C.) | 36 | 24 | 41 | 31 | 28 | 42 | 33 | 27 |
| Volume of whey separated during drainage of curd overnight (ml.) | 570 | 400 | 560 | 300 | 130 | 450 | 130 | 180 |
| Moisture content of curd after drainage overnight (percent) | 50 | 48 | 49 | 44 | 43 | 48 | 44 | 44 |
| Yield of dry weight in curd (g.) [2] | 305 | 295 | | 313 | 288 | 277 | 282 | 258 |
| Total loss of fat in whey (a) separating during process (g.) [3] | 0.6 | 1.3 | 1.2 | 3.3 | 4.8 | 2.8 | 6.9 | 12.4 |
| Total loss of fat in whey (b) separating during drainage (g.) | 3.2 | 1.2 | 2.4 | 2.4 | 1.5 | 3.1 | 1.5 | 1 5.7 |
| pH of curd after one day | 5.4 | 5.2 | 5.0 | 5.5 | 5.8 | 5.5 | 5.8 | 5.8 |
| pH of curd after two days | 4.9 | 5.0 | 5.0 | 5.1 | 5.8 | 5.4 | 5.7 | .8 |
| pH of curd after four days | 4.8 | 4.9 | 4.8 | 5.0 | 5.2 | 4.9 | 5.0 | 5.1 |

[1] I.e. approximate time during which the milk rests on the hot plate.
[2] A reasonable yield for this milk supply on the basis of previous and subsequent analyses of milk from same source, would be 27 g. dry weight from 4.5 l. which is equivalent to 1 lb. of curd of 38% moisture per gallon.
[3] Total fat content of the 2.4 l. of milk—162 g.

EXAMPLE 3

Ninety gallons of raw milk cooled to 10° C. were delivered into a lagged stirred tank and mixed with 10 gallons of sieved 20% starter mixture. This milk was pumped into the curd making device at a constant rate of 20 gallons per hour. Acid was added by means of an automatic pH control device. Rennet was pumped into the milk downstream from the acid. The apparatus was so arranged that the velocity of the stream of milk caused turbulence sufficient for mixing. The resulting curd-forming mixture was delayed long enough to allow the rennet to act by causing the mixture to flow through three stirred 5 gallon jars in series. The mixture flowed thence by gravity through a balance tube to three feed tubes arranged 4–5 cm. apart above an apparatus suitable for coagulating the mixture substantially as illustrated in FIGURES 1 and 2. With a spacing of 4–5 cms. there was a minimum of space between the three films formed on the rotating cylinder, each of which was just over 4 cm. wide. The thermostat in the cylinder was adjusted to 75° C. and the curd left the drum at a temperature of 54–56°. Additional recirculated whey was used to sweep the curd down the plate and through a 14 foot coil of 1″ diameter polythene tube. This produced a treatment time of ½ to 1 minute according to the rate of flow of the whey which could be controlled. The polythene tube debouched on to a woven wire conveyor belt along which the curd moved to its destined container while the whey drained off to a tank contacted to the recirculating and emptying pumps. The recirculated whey was warmed sufficiently to give a temperature of 44° at the exit of the pipe.

At the end of the run the pH of a sample of curd was 5.44 and its moisture content 54%. After drainage over night the curd pH reached 5.05 and its moisture content was reduced to 47% (yield 111 lbs). At this stage the curd was still relatively soft and pasty. It was broken up and mixed with 2% salt, put into 50 lb. moulds and pressed in the usual way, (maximum pressure 12 cwt.). After two days the cheese were much firmer than was to be expected from the softness of the curd. They stood up well during ripening although one of them leaked. At 2½ months the cheese had a soft body with a clean acid flavour. The softness of the curd and the high moisture content were due in part to the quantities of acid and of rennet being below the optimum levels for hard cheese.

EXAMPLE 4

Figure 3:
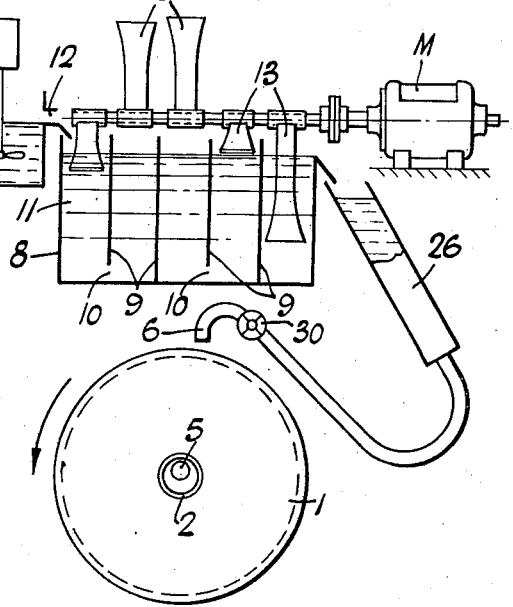
FIGURE 3 is a cross-section of the part of the apparatus used for preparing the curd-forming mixture.

Raw milk at 10° C. was passed at the rate of 6 gallons per hour through a mixing vessel substantially as illustrated in FIGURE 2 in which rennet was added at such a rate that the concentration in the outgoing milk was 1/5000. Acid was also added in the same vessel at the rate of either 320 or 430 ml. of 0.7 M HCl per hour. From the mixing vessel this curd-forming mixture flowed into a delay tank substantially as illustrated in FIGURE 3 of approximately 6 gallons' capacity, and eventually on to the cylinder illustrated in FIGURES 1 and 2 through a single feed tube. Samples of curd were collected from the end of the sloping plate 18 (illustrated in FIGURE 1) and kept for various times in whey at various temperatures before being allowed to drain for 10 minutes. The effects of these variables are shown in table 3. The pH values of the curd next day indicate the extent of high-temperature damage suffered by the starter. These results are an aid to the design of a tank for the treatment of the curd prior to drainage.

EXAMPLE 5

20 gallons of milk were adjusted to pH 6.0 with HCl, cooled to 10° C. and treated for one hour with 1/5000 rennet in the apparatus illustrated in FIGURE 3. This curd-forming mixture was delivered at 6 gallons per hour to the cylinder, illustrated in FIGURES 1 and 2 and the curd caused to flow into the trough through which it was moved by reciprocating vertical paddles the locus of the end of each paddle being a vertical circle of 5" diameter passing just above the bottom of the trough (as illustrated in FIGURE 1). The time spent by the curd in the trough could be controlled by the rate of movement of the paddles. This was adjusted to give a time of 15 to 20 minutes treatment in the whey. The resulting curd was firmer and tougher than the curd prepared by any other modification of this process and was like that produced at an early stage of the cheddaring process during the manufacture of cheddar cheese.

EXAMPLE 6

Forty-five litres of raw milk were inoculated with 0.5 litre of clotted starter (No. 509) and enough hydrochloric acid was added to bring the pH of the milk to 5.8. It was then cooled to 5° and eight portions of 4.5 litres each were bottled and stored in the refrigerator. To the first portion was added 2 ml. of standard cheese-making rennet and 1½ hrs. later the mixture was put through as described in the footnote. The same procedure was followed for each of the other samples except that some were kept for up to 2½ hours after rennet had been added, although it is to be expected that the action of the rennet would be complete in 30–40 min. The apparatus was adjusted to give different conditions of time and temperature for the formation of curd. The yields of curd, losses of fat, and pH values of the curd after different intervals of time are shown in Table 4.

EXAMPLE 7

Twenty-two litres of pasteurised milk were inoculated with 2% of starter (No. 1007), adjusted to pH 5.78 with hydrochloric acid, cooled and treated with rennet as in Example 6. The temperature of the heating water was 90° C. the cycle time of the apparatus was 25 seconds, and the whole of the milk (approximately 5 gallons) was allowed to pass through the apparatus without further attention, the time required being approximately 2½ hours. The curd was collected and allowed to drain for several days at room temperature in a centrally heated building (70–75° F.). During this time 700 ml. of whey drained from the curd. The pH of the curd after 3 days was 5.71 and the moisture at the end of the drainage period was 47%. The curd was broken by hand, salted at the rate of 2% and pressed by hand into a glass jar. The surface of the curd was protected with a disc of greaseproof paper and ripening was allowed to take place at room temperature. After two months the flavour of the resulting curd was rather acid but definitely cheesy. Mould was then allowed to grow so that after four months the cheese had become blue and had a flavour characteristic of blue-veined cheese.

EXAMPLE 8

4.5 litres of raw milk were inoculated with 1% of a clotted starter consisting of Streptococcus thermophilus, acidified, cooled and treated with rennet as in the former examples. The water supplying heat to the steel plate was maintained at 95° C. and the cycle time reduced to 15 sec. The curd was kept overnight at 39° without drainage. Its pH was then 5.5 and its moisture content 45%. After two days at room temperature with drainage the curd had a pH of 5.2 and a moisture content of 42%.

EXAMPLE 9

4.5 litres of raw milk were inoculated with a starter consisting of S. thermophilus and maintained at 40–45° until the pH had fallen to 5.7. The milk was then cooled and stored overnight. Its pH was then found to be 5.6. Fresh milk was added until a pH reading of 5.8 was obtained. The mixture was rennetted as above and put through the apparatus using a water temperature of 95° and a cycle time of 24 sec. After keeping the curd for two days at room temperature with drainage its pH was 5.4 and its moisture content 46%.

EXAMPLE 10

4.5 litres of raw milk were inoculated with 0.5 litre of starter (No. 509), and adjusted to pH 5.7 with HCl. Rennet was allowed to act in the cold as usual at a concentration of 4 ml. per 9 l. for half to 1½ hours. The mixture was put through the apparatus with the heating water at 70° C. and a cycle time of 60 sec. The total time required was 5½ hours. The pH of the curd next day was 5.5. It was stored at room temperature in an atmosphere of carbon dioxide to prevent mould growth. After 2 days 300 ml. of whey had drained out of the curd which was now consolidated into one mass. Its pH at this time was 4.9. The next day an average reading of 4.96 was obtained and a day later the value had fallen to 4.88.

In Examples 6 to 10, the mixture of milk, rennet and acidifying substance was kept for approximately one hour in a domestic type refrigerator and then heated in a thin layer on a stainless steel plate 110 sq. in. in area (690 sq. cm.), the other side of the plate being heated by circulating hot water. An apparatus was arranged to deliver a film of the prepared milk to the plate and then to scrape off the resulting mixture of curds and whey after a definite time interval in the range of 5–100 sec. by means of a scraper behind which was the delivery tube for renewing the film of milk. Thus fresh milk mixture was added each time the curds and whey were scraped off the plate thereby achieving a cyclic or practically continuous process. The curd was received on a moving belt which permitted further drainage during a period which could be varied between 7 and 20 min. before the curd was delivered into a perforated container.

TABLE 3

| Volume of acid added per hour (ml.) | | 430 | | 320 | |
|---|---|---|---|---|---|
| Time of Treatment | Temp. of Treatment, °C. | Moisture, percent | pH Next Day | Moisture, percent | pH Next Day |
| 5 minutes | 55 | 51.9 | 6.04 | 44.1 | 6.04 |
| 10 minutes | 55 | 48.8 | 6.36 | 55.3 | 6.41 |
| 20 minutes | 55 | 47.2 | 6.27 | 52.1 | 6.51 |
| 30 minutes | 55 | 48.5 | 6.35 | 50.8 | 6.51 |
| 50 minutes | 55 | 47.7 | 6.40 | | |
| 5 minutes | 50 | 56.1 | 5.16 | 55.7 | 5.98 |
| 10 minutes | 50 | 53.0 | 5.22 | 53.3 | 5.39 |
| 20 minutes | 50 | 54.0 | 5.44 | 51.4 | 6.15 |
| 30 minutes | 50 | 51.7 | 6.00 | 50.1 | 6.40 |
| 50 minutes | 50 | 50.3 | 6.03 | | |
| 10 minutes in thin layer | 50 | 48.7 | 5.26 | | |
| 5 minutes | 45 | 58.4 | 5.11 | 56.1 | 5.65 |
| 10 minutes | 45 | 56.4 | 5.12 | 57.5 | 5.56 |
| 20 minutes | 45 | 54.9 | 5.16 | 54.2 | 5.90 |
| 30 minutes | 45 | 53.1 | 5.30 | 52.6 | 5.88 |
| 50 minutes | 45 | 52.1 | 5.25 | | |

TABLE 4

| | | | | | | | | |
|---|---|---|---|---|---|---|---|---|
| Temperature of circulating water (°C.) | 60 | 60 | 70 | 70 | 70 | 80 | 80 | 80 |
| Cycle time including 6 sec. wipe-off time (sec.) [1] | 55 | 99 | 28 | 55 | 99 | 28 | 46 | 99 |
| Vol. of milk mixture per cycle (ml.) | 116 | | 82 | 105 | 167 | 92 | 116 | 196 |
| Volume of milk mixture ÷ cycle time (ml./sec.) | 2.1 | | 2.9 | 1.9 | 1.7 | 3.3 | 2.5 | 1.9 |
| Temperature of curd leaving plate (°C.) | 50 | 51 | 51 | 56 | 59 | 57 | 62 | 68 |
| Temperature of curd leaving belt (°C.) | 36 | 24 | 41 | 31 | 28 | 42 | 33 | 27 |
| Volume of whey separated during drainage of curd overnight (ml.) | 570 | 400 | 560 | 300 | 130 | 450 | 130 | 180 |
| Moisture content of curd after drainage overnight (percent) | 55 | 48 | 49 | 44 | 43 | 48 | 44 | 44 |
| Yield of dry weight in curd (g.) [2] | 305 | 295 | | 313 | 288 | 277 | 282 | 258 |
| Total loss of fat in whey (a) separating during process (g.) [3] | 0.6 | 1.3 | 1.2 | 3.3 | 4.8 | 2.8 | 6.9 | 14.2 |
| Total loss of fat in whey (b) separating during drainage (g.) | 3.2 | 1.2 | 2.4 | 2.4 | 1.5 | 3.1 | 1.5 | 1.7 |
| pH of curd after one day | 5.4 | 5.2 | 5.0 | 5.5 | 5.8 | 5.5 | 5.8 | 5.8 |
| pH of curd after two days | 4.9 | 5.0 | 5.0 | 5.1 | 5.8 | 5.4 | 5.7 | 5.8 |
| pH of curd after four days | 4.8 | 4.9 | 4.8 | 5.0 | 5.2 | 4.9 | 5.0 | 5.1 |

[1] I.e. approximate time during which the milk rests on the hot plate.
[2] A reasonable yield for this milk supply on the basis of previous and subsequent analyses, would be 278 g. dry weight from 5.4 l. which is equivalent to 1 lb. of curd of 38% moisture per gallon.
[3] Total fat content of the 4.5 l. of milk—162 g.

I claim:

1. A process for the manufacture of curd, which comprises heating a curd-forming mixture comprising milk and rennet, in which the enzymic action of the rennet is at least nearing completion but in which coagulation has not visibly commenced, in a form in which its surface area is large compared with its volume to cause rapid coagulation of the curd-forming mixture followed by rapid exudation of whey.

2. A process according to claim 1 wherein coagulation is caused by heating the curd-forming mixture to a temperature in the range of about 30° C. to 70° C.

3. A process according to claim 2 wherein coagulation is caused by heating the curd-forming mixture to a temperature in the range of about 50° C. to 70° C.

4. A process for the manufacture of curd which comprises contacting a curd-forming mixture comprising milk and rennet, in which the enzymatic action of the rennet is at least nearing completion but in which coagulation has not visibly commenced, in the form of a thin film, with a heated metal surface to cause rapid coagulation of the curd-forming mixture followed by rapid exudation of whey.

5. A process according to claim 4 in which the heated metal surface is the heated surface of a rotating cylinder.

6. A process according to claim 5 in which the curd-forming mixture is continuously delivered on to the heated outer metal surface of a cylinder rotating about a substantially horizontal axis at a position such that it is maintained in contact with said surface by force of gravity and surface tension for a time such that rapid coagulation of the curd-forming mixture occurs, and the coagulated curd is then removed.

7. A process according to claim 6 wherein the coagulated curd is removed at least in part by the force of gravity.

8. A process according to claim 6 in which the curd-forming mixture is delivered on to the heated surface of the rotating cylinder at a position on the ascending side of the cylinder slightly removed from the vertical plane in which the rotational axis of the cylinder lies, the rotational speed of the cylinder being arranged such that, by the time the force of gravity is acting upon the curd to remove it from the heated surface, coagulation has occurred.

9. A process according to claim 6 in which the heated surface of the rotating cylinder is heated to a temperature in the range of about 60° C. to 100° C. and the rotational speed of the cylinder is in the range of about 20 to 40 rotations per minute.

10. A process according to claim 6 in which the curd-forming mixture is delivered to the surface of the cylinder through a pipe of about ¼" internal diameter.

11. A process according to claim 6 in which exuded whey which has adhered to the cylinder surface is removed from the surface of the cylinder at a position around the circumference of the cylinder beyond that at which the curd is removed.

12. A process according to claim 11 wherein exuded whey which has adhered is removed at a position on the upwards moving side of the rotating cylinder.

13. A process according to claim 5 in which the coagulated curd exudes whey whilst in contact with additional warm whey.

14. Apparatus for carrying out the process of claim 4 comprising a horizontally-mounted cylinder, said cylinder having a metallic outer surface, means for delivering a thin film of curd-forming mixture on to the outer surface of the said cylinder at a position such that the curd-forming mixture is maintained in contact with the said surface by force of gravity and surface tension, means for heating the outer surface of the cylinder to a temperature in the range of about 60° C. to 100° C. and means for rotating the cylinder about its horizontal axis at a speed such that the curd-forming mixture is maintained in contact with the outer surface until coagulation has occurred.

15. Apparatus according to claim 14 in which scraping means are provided on the upwards moving side of the cylinder which serves to remove exuded whey which has adhered to the surface of the cylinder.

16. Apparatus according to claim 15 in which the said scraping means is a brush which is rotatably mounted and is rotated at a speed of the order of 100 revolutions per minute in the same rotational direction as that of the cylinder.

17. Apparatus according to claim 14 wherein means are provided for contacting coagulated curd removed from the cylinder with additional whey during exudation of the curd.

18. A process for the manufacture of curd which comprises holding a curd-forming mixture comprising milk and rennet at a temperature not higher than 15° C. under non-coagulating conditions for at least a period of time that the enzymic action of the rennet is at least nearing completion, subsequently heating the mixture rapidly in a form in which its surface area is large compared with its volume to a temperature of at least 30° C. and holding the mixture such form at such higher temperature so that rapid coagulation of curd followed by rapid exudation of whey can occur.

19. A process according to claim 18 in which the curd-forming mixture comprises milk and rennet to which sufficient acidifying substance has been added to give the milk a pH of 5.6 to 6.0.

20. A process according to claim 19 in which at least a part of the acidifying substance added is a starter.

21. A process according to claim 20 in which the acidifying substance is a combination of starter and acid.

22. A process according to claim 20 in which the starter is selected from the group consisting of *Streptococcus thermophilus* and *Streptococcus cremoris*, and *Streptococcus lactis*.

23. A process according to claim 18 in which the curd-forming mixture is held at a temperature of not more than 15° C. for at least a period of time equal to that calculated by doubling the time required for the curd-forming mixture to clot at 30° C. for every ten centigrade degrees below 30° C. at which the mixture is held.

24. A process according to claim 23 in which the curd-forming mixture is held at about 10° C. for about 1 hour.

References Cited in the file of this patent

UNITED STATES PATENTS

| | | |
|---|---|---|
| 1,953,734 | Plawenn et al. | Apr. 3, 1934 |
| 2,712,999 | Streznski | July 12, 1955 |

OTHER REFERENCES

"The Manufacture of Cheese of the Cheddar Type From Pasturized Milk," Sammis and Bruhn, Dept. of Agriculture Bulletin 165, issued June 30, 1913, Government Printing Office, Washington, D.C., pages 15–17.